(12) United States Patent
Winn et al.

(10) Patent No.: US 11,899,579 B2
(45) Date of Patent: Feb. 13, 2024

(54) SYSTEMS AND METHODS FOR NORMALIZING DATA FROM MULTIPLE SOURCES

(71) Applicant: StockX LLC, Detroit, MI (US)

(72) Inventors: Stephen Jeffrey Winn, Grosse Pointe Park, MI (US); Michael Lee Kozlowski, West Bloomfield, MI (US); Brandon Mills Craft, Detroit, MI (US); Lane Shetron, Flushing, MI (US)

(73) Assignee: StockX LLC, Detroit, MI (US)

( * ) Notice: Subject to any disclaimer, the term of this patent is extended or adjusted under 35 U.S.C. 154(b) by 69 days.

(21) Appl. No.: 17/212,567

(22) Filed: Mar. 25, 2021

(65) Prior Publication Data

US 2021/0397552 A1   Dec. 23, 2021

Related U.S. Application Data

(60) Provisional application No. 63/042,336, filed on Jun. 22, 2020.

(51) Int. Cl.
*G06F 7/00* (2006.01)
*G06F 12/06* (2006.01)
(Continued)

(52) U.S. Cl.
CPC ............ *G06F 12/0646* (2013.01); *G06F 7/08* (2013.01); *G06F 7/24* (2013.01); *G06Q 40/04* (2013.01); *G06F 2212/1041* (2013.01)

(58) Field of Classification Search
CPC .......... G06F 12/0646; G06F 7/08; G06F 7/24; G06Q 40/04
See application file for complete search history.

(56) References Cited

U.S. PATENT DOCUMENTS 7,386,565 B1   6/2008 Singh et al.
8,032,561 B1 * 10/2011 Nadj .................. G06F 7/22
                                                            707/799
(Continued)

OTHER PUBLICATIONS

Application No. PCT/US2021/037001, International Search Report and Written Opinion, dated Oct. 11, 2021, 13 pages.
(Continued)

*Primary Examiner* — Rajesh Khattar
(74) *Attorney, Agent, or Firm* — Kilpatrick Townsend & Stockton LLP (57) ABSTRACT

A system includes a processor and a memory including instructions that are executable for causing the processor to perform operations. The operations include accessing a new component value and a set of inner heaps. Each inner heap of the set of inner heaps includes a sorted set of components originating from a plurality of component sources. The operations further include assigning the new component value to a first inner heap of the set of inner heaps. In response to assigning the new component value to the first inner heap, the operations include sorting the first inner heap to identify a maximum or minimum value of the first inner heap. In response to determining that the new component value changes the maximum or minimum value of the first inner heap, the operations include updating an outer heap to include a reference to the new component value of the first inner heap.

20 Claims, 4 Drawing Sheets

(51) Int. Cl.
*G06F 7/08* (2006.01)
*G06F 7/24* (2006.01)
*G06Q 40/04* (2012.01)

(56) References Cited

U.S. PATENT DOCUMENTS

| | | | |
|---|---|---|---|
| 8,341,153 B2* | 12/2012 | Tian | G06F 7/24 |
| | | | 707/752 |
| 2011/0060748 A1* | 3/2011 | Tian | G06F 7/24 |
| | | | 707/752 |
| 2012/0023142 A1 | 1/2012 | Diorio et al. | |
| 2012/0215992 A1* | 8/2012 | Stanfill | G06F 7/22 |
| | | | 711/E12.001 |
| 2021/0097609 A1* | 4/2021 | Shteynberg | G06Q 20/065 |

OTHER PUBLICATIONS

PCT/US2021/037001, "International Preliminary Report on Patentability", dated Jan. 5, 2023, 10 pages.

* cited by examiner

SYSTEMS AND METHODS FOR NORMALIZING DATA FROM MULTIPLE SOURCES

CROSS-REFERENCE TO RELATED APPLICATIONS

This application claims benefit of and priority to U.S. Provisional Application Ser. No. 63/042,336, filed Jun. 22, 2020, and titled "SYSTEMS AND METHODS FOR NORMALIZING DATA FROM GEOGRAPHICALLY-DISTRIBUTED LOCATIONS," the entire contents of which are hereby incorporated by this reference.

TECHNICAL FIELD

Certain aspects and features relate to a system and method for enhancing computational efficiency. More specifically, but not by way of limitation, the disclosure relates to efficient normalization and storage of components obtained from multiple sources.

BACKGROUND

In an example, components, such as data, may be received at a common storage location from a plurality of different sources. Because the components originate from multiple sources, a sorting of the components may not be strictly performed based on a raw value of the component, such as a raw numerical value. For example, the components may include different weights based on the sources that originate the components. By way of example, some components have a value-adding or value-limiting weighting based on the source of the component. Accordingly, raw numerical values from varying sources may not always be equivalent and sorting based on the raw numerical values may result in an incomplete sorting representation of the components.

In some examples component storage may be segmented by the component sources because a computational and memory efficient system for managing and normalizing information associated with the multiple component sources is not available. By segmenting the component sources, a system for storing and using the components associated with the component sources is computationally simplified. While the segmented component storage techniques limit computational complexity, the segmented storage techniques prevent users from leveraging components from the multiple component sources in a mutually beneficial manner.

SUMMARY

Systems and methods for efficient normalization of components obtained from multiple sources are provided.

According to various aspects of the present disclosure, a system may include a processor and a memory including instructions that are executable for causing the processor to perform operations. The operations include accessing a new component value and a set of inner heaps. Each inner heap of the set of inner heaps includes a sorted set of components originating from a plurality of component sources. The operations further include assigning the new component value to a first inner heap of the set of inner heaps. In response to assigning the new component value to the first inner heap, the operations include sorting the first inner heap to identify a maximum or minimum value of the first inner heap. In response to determining that the new component value changes the maximum or minimum value of the first inner heap, the operations include updating an outer heap to include a reference to the new component value of the first inner heap.

In an additional example, a method includes accessing a new component value and accessing a set of inner heaps. Each inner heap of the set of inner heaps comprises a sorted set of components, and wherein the sorted set of components originate from a plurality of component sources. The method also includes assigning the new component value to a first inner heap of the set of inner heaps. In response to assigning the new component value to the first inner heap, the method includes sorting the first inner heap to identify a maximum or minimum value of the first inner heap. In response to determining that the new component value changes the maximum or minimum value of the first inner heap, the method includes updating an outer heap to include a reference to the new component value of the first inner heap.

In an additional example, a non-transitory computer-readable medium stores instructions executable by a processing device to perform operations. The operations include accessing a new component value and a set of inner heaps. Each inner heap of the set of inner heaps includes a sorted set of components originating from a plurality of component sources. The operations further include assigning the new component value to a first inner heap of the set of inner heaps. In response to assigning the new component value to the first inner heap, the operations include sorting the first inner heap to identify a maximum or minimum value of the first inner heap. In response to determining that the new component value changes the maximum or minimum value of the first inner heap, the operations include updating an outer heap to include a reference to the new component value of the first inner heap.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE DRAWINGS

Aspects and features of the various examples will be more apparent by describing examples with reference to the accompanying drawings, in which.

DETAILED DESCRIPTION

While certain examples are described herein, these examples are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

The disclosure relates to normalizing components originating from multiple sources. By normalizing the components across multiple sources, such as sources in geographically-distributed regions, commonalities between the components may be obtained. The commonalities between the components from the multiple sources may encourage mutually beneficial interactions associated with the components from the multiple sources. The components may be stored in a type of data structure designed to improve the way a computer stores and retrieves the components, such as data, in memory.

For example, a geographically-distributed nature of an exchange may be maintained by normalizing components, including price information, across localities to foster geofenced exchanges (e.g., encouraging transactions between buyers and sellers located in a same geographical region, country, or free-trade region), lower total purchase costs, lower shipping costs, minimize delivery times, and encourage a best available price for an item purchaser. All of these features may occur while implementing techniques that encourage efficient and unique data storage and retrieval structures associated with both the normalized components and raw components prior to normalization.

Continuing with the exchange example, fostering these improvements to a peer-to-peer exchange may be accomplished by dynamically adjusting pricing data for each participant in the exchange according to a country or region of the exchange participant, while not limiting access of the participant to global liquidity of a product. The effect is a system that requires no change in user interaction to facilitate a local exchange and results in lowered total costs, faster shipping, and international seller growth. Additionally, a unique data storage and retrieval structure improves performance of a computing system that hosts the peer-to-peer exchange.

A normalization technique of the example peer-to-peer exchange works by incorporating weightings associated with the components included in the peer-to-peer exchange. The weightings may include inclusion or removal of values associated with duties, taxes, tariffs, and other applicable fees to offset out-of-zone shipping costs or inefficiencies into a quoted 'asking' price for a product provided in the peer-to-peer exchange. Collectively, these fees may be referred to as weightings for normalizing the components. In some examples, normalized component values may differ by exchange participants according to a location of the exchange participant. The normalized component values may also differ based on a location of a seller of the product, and the normalized component values may differ based on applicable import fees between the seller and various purchasers. For example, a purchaser in the United States purchasing a product from an seller in the United States may see a different, lower normalized component value for the product than a purchaser in the United Kingdom purchasing the same product from the same seller in the United States. Additionally, any 'asking' prices originating in the same country or free-trade area as a purchaser may incur no additional markup, thereby enabling and encouraging efficient local transactions. In some examples, the seller may be anonymous, such that a buyer does not consider where the seller is located.

In a "stock market" style order book containing all active asks and bids, outstanding asks are held sorted in ascending order and bids in descending order. When the two sides intersect (e.g., a lowest ask and a highest bid), a match occurs resulting in a transaction. Similarly, the basis of pricing in the technique described herein provides a mechanism for a lowest ask and a highest bid to match. The unique data structure described herein also enables the incorporation of applicable fees, which may generally be referred to as weightings, associated with the transaction into the cost structure. This technique, however, introduces technical complexity due to the high number of cost permutations used to represent all of the possible origin-destination region combinations.

To efficiently match components, such as asks and bids, in the data structure and to produce normalized components, such as price quotes for the price permutations, the specialized data structure and weighting mechanism may be used in a matching technique. For example, data components may be represented through a combination of heap data structures, such as a min-heap storing all components where a minimum amount is desirable (e.g., a minimum price of all asks) and a max-heap storing all components where a maximum amount is desirable (e.g., a maximum price of all bids). As used herein, the term "heap" may be used to represent a tree-based data structure that satisfies a heap property. In an example, a max-heap property may indicate that a value (i.e., price) of a parent node in the heap data structure will always be greater than or equal to a value of a child node. Similarly, a min-heap property may indicate that the value of the parent node in the heap data structure will always be less than or equal to the value of the child node.

The heap data structures may be made efficient by not guaranteeing strict ordering of the underlying held items. For example, only the current 'top-most' element in the heap data structure is a maximum or minimum value depending on the particular heap property of the heap data structure, and the remaining elements may be maintained in an unordered state. The heap algorithm itself may be capable of storing or sorting any arbitrary set of data so long as a weighting mechanism is provided. In the presently described technique, a heap data structure also includes nested heaps, where outer-heaps store and sort on in-memory, weighted references to inner heaps which contain the actual elements (e.g., bids and asks).

The nested-heap storage structure may be constructed by maintaining 'inner' heaps that are specific to particular component sources. For example, the inner heaps may be associated with weighting rules applicable to the particular component sources. The inner heaps are then combinable to form a normalized component structure using a series of 'outer' heaps. The outer heaps, which contain references to the underlying inner heaps, also include weighting rules specific to the particular component sources. The weighting rules for the inner heaps and the outer heaps may define a weighting applied to the component values of the inner heaps to generate the normalized component structure based on the relationship between the outer heaps and the inner heaps. For example a particular outer heap's relationship with a particular inner heap may indicate that a particular weighting should be added to an inner heap component value to generate the normalized component structure. In other words, the outer heaps each represent an ordered view of components from the inner heaps that is adjusted for applicable weighting associated with a particular component consumer. The outer heaps may be sorted by internally adjusting each inner heap's top-most element by the applicable weighting associated with the particular component source that the inner heap represents and the particular component consumer represented by the outer heap.

In an illustrative example, the nested-heap storage structure may be constructed by maintaining, for each product provided on an order book, inner heaps that are specific to each country or trade region with active bids or asks weighted by their local, unadjusted prices. In some examples, weighting the bids or asks in the inner heap includes only identifying the maximum bid value or the minimum ask value within the inner heaps. The inner heaps are then combined to form a complete, global order book made visible to participants in the exchange using a series of outer heaps. The outer heaps, which contain references to the underlying inner heaps, are also country or trade region specific. In other words, the outer heaps each represent a view adjusted for applicable fees associated with transactions for products in the global exchange from an associated location of a potential participant in the exchange. The outer heaps may be sorted by internally adjusting each inner heap's top-most element by the applicable fees between the country or trade region that the inner heap represents and the associated country or trade region represented by the outer heap. In an example, the inner heap representing the same country as the outer heap, or any other countries or trade regions with no applicable fees (e.g., through free-trade agreements), will remain unadjusted. Thus, the inner heaps representing the same country as the outer heap may be preferentially weighted as asks and bids of a geofenced exchange.

The weighting process may include adding a cost of duties and taxes, which may collectively be referred to as weightings, for each value included in the outer heap ask and subtracting a cost of duties and taxes for each value included in the outer heap bid. In some examples, the addition or subtraction of the cost of duties and taxes may be an estimate of the actual duties and taxes required to purchase a product. The weightings added or subtracted may be based on duties and taxes between a country or trade region of an exchange participant (e.g., a potential buyer or seller) viewing the outer heap and the countries associated with the values included in the outer heap. In some examples, trade regions may include groups of countries with a trade agreement, or groups of regions, states, or provinces within a country with similar amounts of duties and taxes (e.g., local tax rates). Tariffs and other fees to offset out-of-zone shipping costs or inefficiencies may also be included in the weighting process. In this manner, a geofenced exchange (e.g., a transaction that occurs within the same country or trade region with no applicable fees) is preferentially weighted because it will not include the cost of applicable fees associated with a transaction from other non-geofenced transactions. Other weighting techniques may also be used.

The nested data structure may be used to update information in the outer heap on-the-fly, as new information is provided to the inner heaps, without recalculating all various global permutations or holding duplicate information in-memory. In the order book example, an ask or bid change may trigger a single rebalance in an associated country or trade region inner heap that receives the ask or bid change. In turn, the outer heaps containing the inner heap may be rebalanced only if a top-most element of the inner heap has changed. The outer heaps may also only contain references to the individual underlying top-most elements of the inner heaps. That is, the number of elements sorted at the outer heap is constrained to the number of supported countries or trade regions represented by the inner heaps that are referenced by the outer heap. Further, the elements sorted at the outer heap may only be references to inner heap elements. Accordingly, maintaining different copies of the elements may be avoided.

Further, the nested data structure is not limited only to the application of order books. A generalization of the nested data structure could efficiently handle any desired dimension, such as currency exchange rates. Further, the inner heaps and outer heaps may include non-numerical values. In such an example, the heaps may be sorted and weighted based on the non-numerical values.

Alternative heap structures may also be used. For example, the nesting of a data structure could be broken out into many duplicate heaps. In such an example, each of the duplicate heaps may represent one of the global permutations. In another example, the outer heaps of the nested data structure could be reduced to a single reusable heap by sequentially rebalancing the reusable heap multiple times with weights associated with duties and taxes of each country or trade region.

In an additional example, a database, language, or library supporting sorted lists can be leveraged to practice the described technique by storing bids and asks adjusted for duties and taxes in multiple sorted lists representing each of the origin-destination country or trade region pairs. Further, a relational database housing a table of bids and asks may be used to compute adjustments for duties and taxes on-the-fly.

Figure 1:
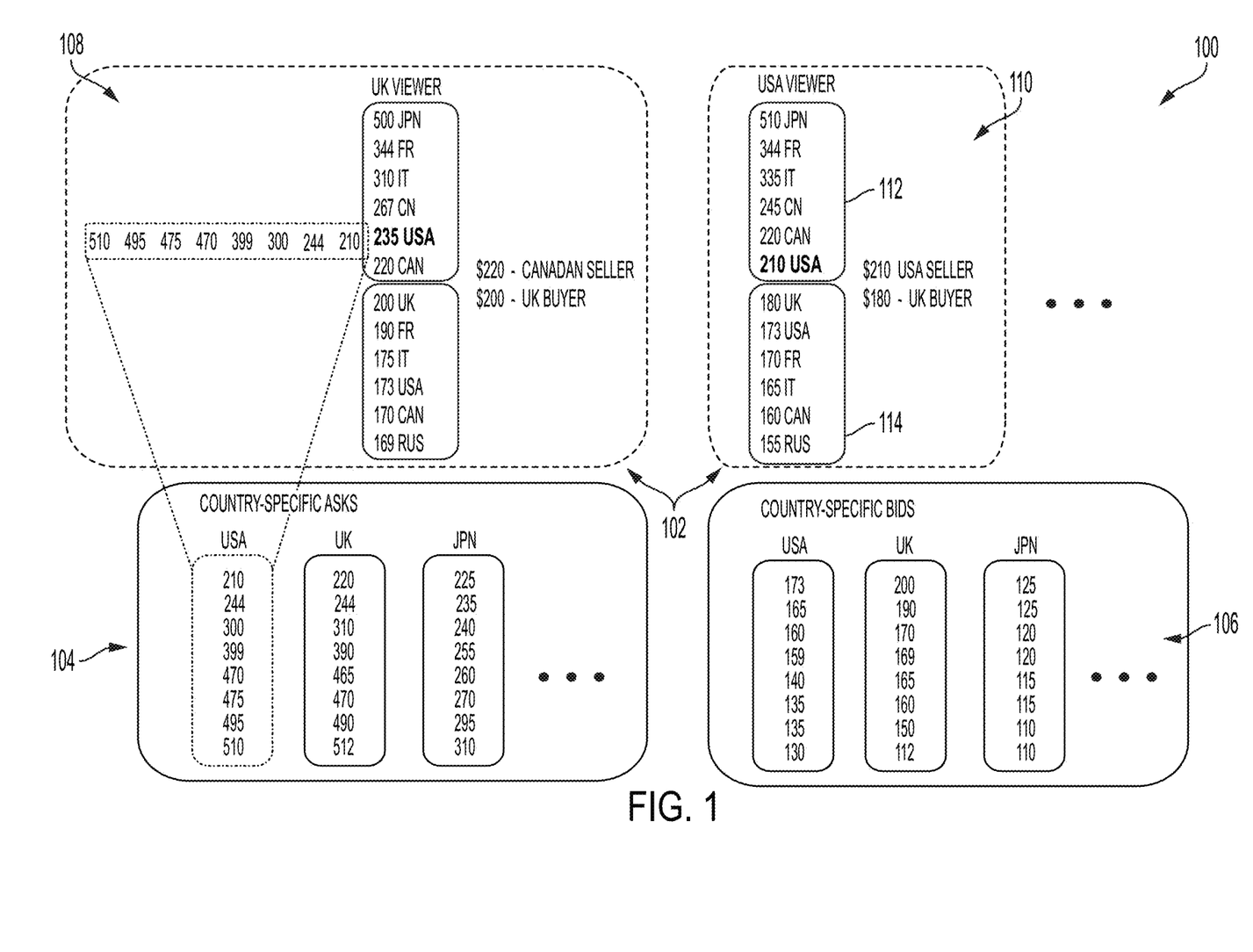
FIG. 1 is an example of a nested-heap storage structure, in accordance with one or more examples.

FIG. 1 is an example of a nested-heap storage structure 100. While the nested-heap storage structure 100 is depicted as an order book, the nested-heap storage structure 100 may also be implemented for use with any other sets of information for any additional purposes. As illustrated, upper groupings 102 include examples for outer heaps (e.g., a "UK Viewer" and a "USA Viewer") of the nested-heap storage structure 100. A lower grouping 104 (e.g., "Country-specific asks") and a lower grouping 106 (e.g., "Country-specific bids") include examples for inner heaps (e.g., "USA," "UK," and "JPN") of the nested-heap storage structure 100.

In an example, the lower grouping 104 includes country-specific order books for 'asks,' and the lower grouping 106 includes country-specific order books for 'bids.' As shown, the asks are arranged using a min-heap property of the asks inner heaps such that the minimum value for a country or trade region is represented in an associated outer heap of the upper groupings 102. Similarly, the bids are arranged using a max-heap property of the bids inner heaps such that the maximum value for a country or trade region is represented in the associated outer heap of the upper groupings 102.

In an example, the asks and bids provided to the nested-heap storage structure 100 may be automatically added to particular inner heaps based on a location of where the asks and bids were provided (e.g., a physical location of a mobile phone or computing device that entered the asks and bids). In another example, the asks and bids can be assigned to an inner heap based on a manual input from a user that enters the asks and bids. For example, an ask or bid entry may include an option to select a location for a potential transaction.

The outer heaps in the upper groupings 102 are represented by country or trade region viewers. For example, a UK viewer 108 displays weighted asks and bids for a purchaser or a seller of a product in the UK. Similarly, a USA viewer 110 displays weighted asks and bids for a purchaser or a seller of the same product in the USA. In an example, the viewers provide the weighted asks and bids in the currency of the viewer (e.g., GBP for the UK viewer 108 and USD for the USA viewer 110). In an additional example, a user has the ability to select a desired currency.

The USA viewer 110 includes an asks section 112 and a bids section 114. The asks section 112 includes the minimum values from each of the country specific asks inner heaps that are normalized based on the country of the viewer. For example, the asks section 112 of the USA viewer 110 includes the minimum values for each of the 'asks' inner heaps, and the minimum values are normalized for an exchange occurring within the United States. Similarly, the bids section 114 includes the maximum values from each of the country specific 'bids' inner heaps, and the maximum values are normalized based on the country of the viewer. For example, the bids section 114 of the USA viewer 110 includes the maximum values for each of the bids inner heaps that are normalized for an exchange occurring within the United States.

As shown, the maximum value in the lower grouping 104 for the USA inner heap is 210. In the UK viewer 108, a weighting is applied to the 210 value to generate an ask of 235 for a USA seller based on costs associated with a transaction from a USA seller to a UK buyer. In other words, the weighting is more than simply a currency converter and also includes weighting associated with the relationship between a location of the outer heap (e.g., the UK) and a location of the inner heap (e.g., the USA). In the USA viewer 110, no weighting is applied to the 210 value because the transaction would occur between a USA seller and a USA buyer.

In an example, the viewers in the upper groupings 102 may only display a maximum bid and a minimum ask value from the outer heaps. The maximum bid value and the minimum ask value may provide a current indication of market conditions. In another example, the outer heaps in the upper groupings 102 may display the six largest bid values and the six smallest ask values to the user, as illustrated in FIG. 1. In such an example, the user may be able to ascertain how strong the market value of a particular product is at the maximum bid and minimum ask prices. For example, the market value of the product may be stronger when the five bid values are similar and when the five ask values are similar. Other numbers of displayed ask and bid values may also be used.

The country or trade region associated with the viewers 108 and 110 in the upper groupings 102 may be determined based on a physical location of a mobile device that accesses the viewer, a physical location of a computing device that accesses the viewer, a location provided by a user, or a country or location preference selected by the user. As shown, the weighted asks include minimum ask values indicated in inner heaps of designated countries or trade regions in the lower groupings 104, where the ask values are weighted by adding duties and taxes required for purchasing the product from the UK or from the USA. Additionally, the weighted bids include maximum bid values indicated in inner heaps of designated countries or trade regions, where the weighted bid values are weighted by deducting the duties and taxes required for selling the product from the UK or from the USA, respectively. Similar to the inner heaps, the outer heaps may be arranged using min-heap properties for the asks and max-heap properties for the bids when only an individual outer heap value is displayed in the viewers 108 and 110 of the upper groupings 102.

Values for the applicable fees between each jurisdiction may be obtained from a table of import fees. For example, the duty and tax rates may be obtained from an external service or a periodically updated table that is stored as a component of an application that operates the nested-heap storage structure. Identified duties and taxes for a potential ask and bid transaction may be applied as weighting mechanisms to show a true cost of the transaction to a purchaser or a seller of a product.

In some examples, 200 or more different inner heaps may be generated for a particular product. More or fewer inner heaps may also be used. In providing such a large number of inner heaps, the nested-heap system may expose product purchasing and selling efficiencies on a global basis. Further, unnecessary computing costs may be avoided because the outer heaps only include the weighted ask and bid values that are adjusted for duties and taxes from the maximum bid values and the minimum ask values of the inner heaps (e.g., as opposed to the weighted ask and bid values for every ask and bid in the inner heaps).

Further, because the outer heap values are in-memory references to individual values located in the inner heaps, separate copies of the outer heap values may be avoided. For example, each outer heap stores and sorts the in-memory references to the same values located in the inner heaps. The sorting and display of values may vary between the outer heaps based on the weighting rules associated with the outer heap relation to the inner heap. For example, the sorting may be based on the added or subtracted costs based on rules associated with transactions occurring between or within various countries or regions. This referential structure of the nested heaps may provide greater efficiency in memory usage when compared to other storage systems without a referential structure. Further, the nested-heap storage structure 100 is described above with respect to an order book for an individual product. When multiple products are listed on an exchange, each of the products may have a different nested-heap storage structure 100 to store and display the ask and bid values for each of the listed products of the exchange.

Figure 2:
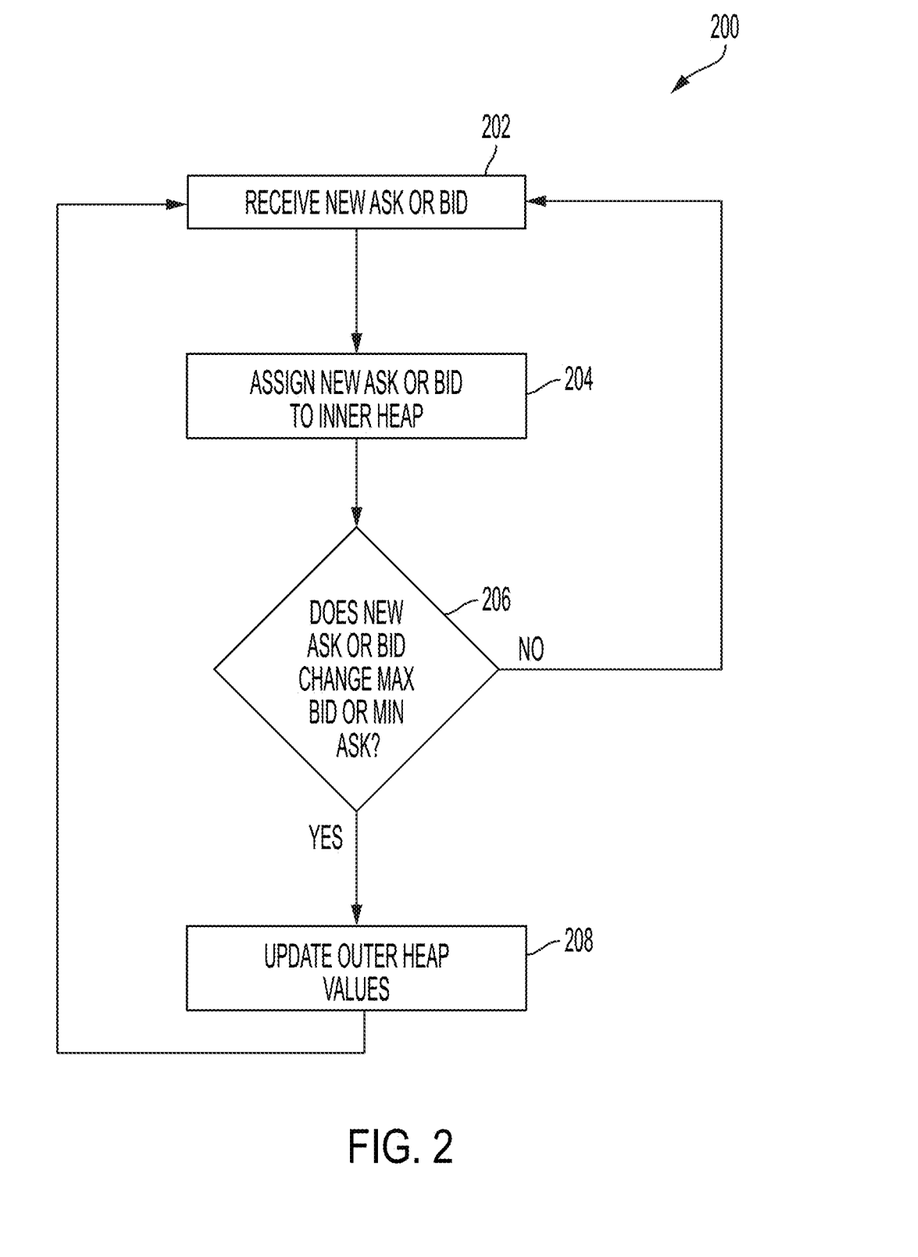
FIG. 2 is a flowchart of a process for updating the nested-heap storage structure based on an addition of new information to the nested-heap storage structure, in accordance with one or more examples.

FIG. 2 is a flowchart of a process 200 for updating the nested-heap storage structure 100 based on an addition of new information to the nested-heap storage structure 100. While the process 200 is described using an order book example, it may be appreciated that the process 200 can be used for any implementation of the nested-heap storage structure 100. At block 202, the process 200 involves receiving a new ask or bid value for a product. The new ask or bid value may be provided by a user or otherwise accessed by a computing system performing the process 200.

At block 204, the process 200 involves assigning the new ask or bid value to an inner heap of the nested-heap storage structure 100. The inner heap may be part of the lower grouping 104 of the nested-heap storage structure 100 in FIG. 1. The assignment of the particular inner heap may be based on where the new ask or bid originated (e.g., a physical location where a user entered the information), or the new ask or bid may be manually assigned to an inner heap based on a manual indication of a location from which a buyer or seller would buy or sell the product.

At block 206, the process 200 involves determining whether the new ask or bid changes a maximum bid or a minimum ask of the inner heap. For example, the new ask may have a smaller ask price than any of the other asks in the inner heap. Similarly, the new bid may have a larger bid price than any of the other bids in the inner heap. If the new ask or bid does not change the maximum bid or the minimum ask, then the process 200 may return to block 202 to receive an additional new ask or bid without changing values associated with the outer heap.

If the new ask or bid does change the maximum bid or the minimum ask, then, at block 208, the process 200 involves updating outer heap values, such as the values in the upper groupings 102 of the nested-heap storage structure 100. For example, the value from the inner heap that is referenced by the outer heap will change based on the new ask or bid value and the application of the weighting to the new ask or bid value. For example, the raw ask or bid value may be weighted in the outer heap based on the relationship between the outer heap and the location of the inner heap to generate a weighted ask or bid value. Further, an order of the weighted asks or bids of the outer heap may change depending on if the new weighted ask or bid changes a position of the referenced inner heap within the outer heap. Upon updating the outer heap values, the process 200 may return to block 202 to receive additional new asks or bids.

Figure 3:
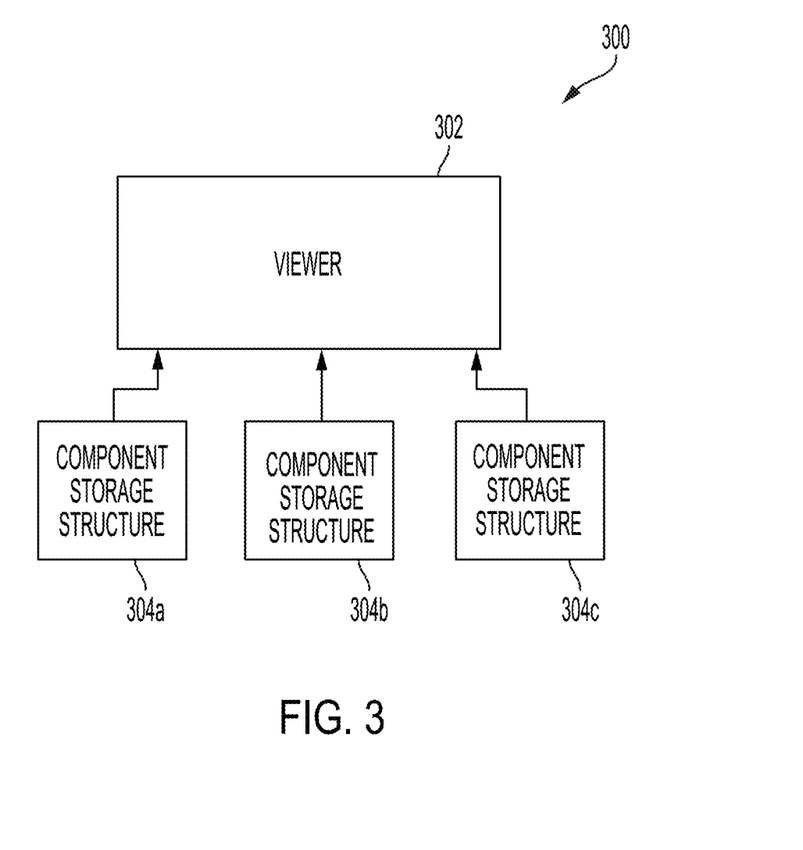
FIG. 3 is a block diagram of an example of a nested-heap storage structure, in accordance with one or more examples.

FIG. 3 is a block diagram of an example of a nested-heap storage structure 300. The nested-heap storage structure 300 includes a viewer 302 and a set of component storage structures 304a-304c. The nested-heap storage structure 300 may filter data components based on criteria associated with a relationship between the viewer 302 and each of the component storage structures 304a-304c. In an example, the viewer 302 may be an outer heap, similar to the outer heaps described above with respect to FIGS. 1 and 2, and the set of component storage structures 304a-304c may be inner heaps, similar to the inner heaps described above with respect to FIGS. 1 and 2.

The component storage structures 304a-304c may receive component values from various sources. In some examples, the component values may include a primary component, such as a value, and a secondary component, such as a location or other clustering feature. The primary component for each of the component values may be assigned to a particular component storage structure 304a-304c based on the secondary components of the component values. For example, each of the component storage structures 304a-304c may be associated with a different location associated with the varying component values, such as a location where the component values originated.

Upon populating the component storage structures 304a-304c with the component values, the component storage structures 304a-304c may be sorted such that a maximum or minimum value of each of the component storage structures 304a-304c is identified. The maximum values, minimum values, or both may be provided to the viewer 302 for further processing and display to a user. A relationship between the secondary component of each of the component storage structures 304a-304c and a criteria or perspective of the viewer 302 may be used to determine a weighting factor, or any other adjustment, applied to the primary components of the maximum or minimum values of the component storage structures 304a-304c to generate a normalized value output by the viewer 302.

Figure 4:
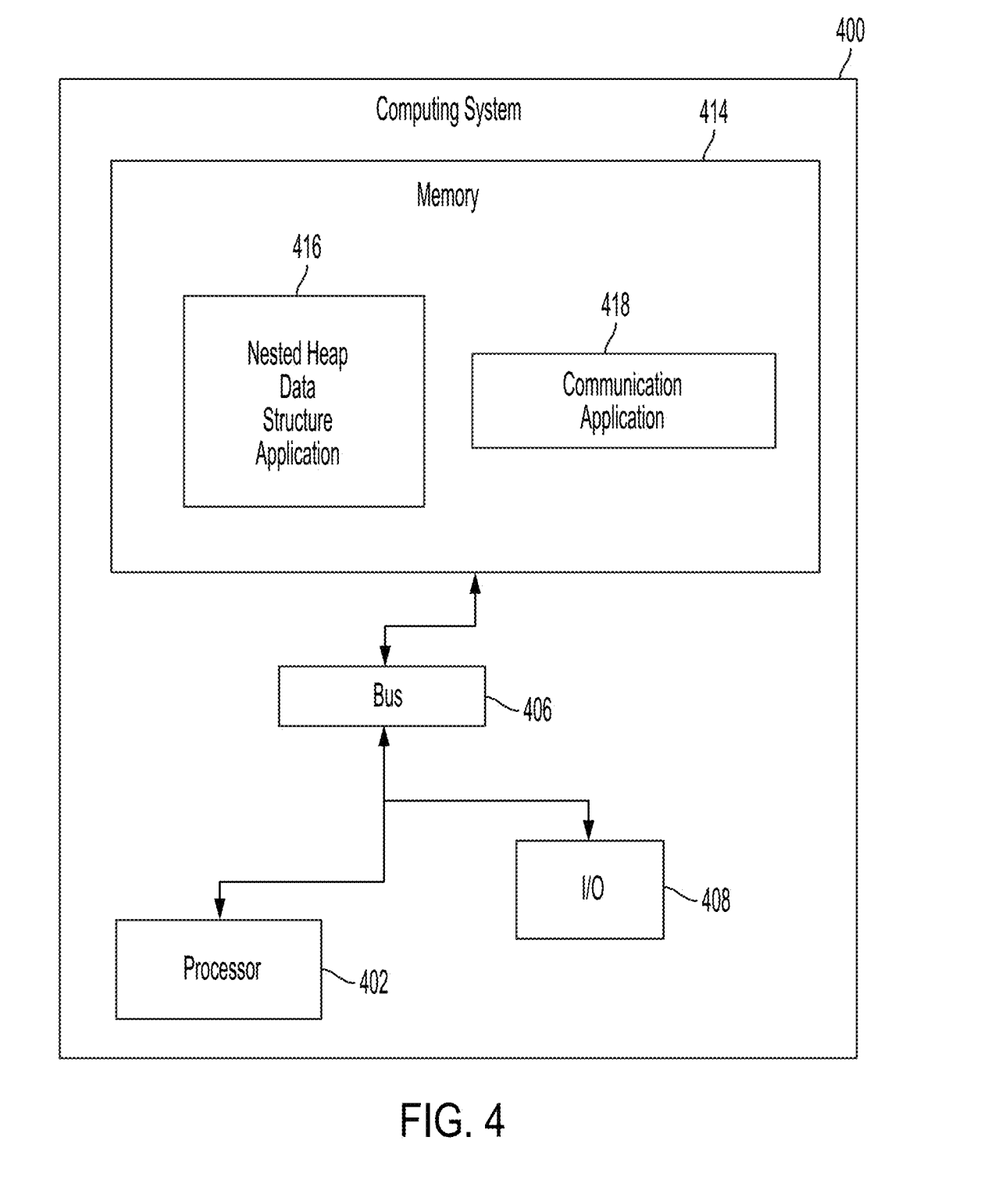
FIG. 4 is an example of a block diagram of components of a computing system, in accordance with one or more examples.

FIG. 4 is an example of a block diagram of components of a computing system 400. Some or all of the components of a computing system 400 can perform the operations described above with respect to the nested-heap storage structure 100. The computing system 400 includes one or more processors 402 communicatively coupled to one or more memory devices 414. The computing system 400 executes program code that configures the processor 402 to perform one or more of the operations described above with respect to the nested-heap storage structure 100. For example, the memory devices 414 may include a nested-heap storage structure application 416 and a communication application 418. The program code of the nested-heap storage structure application 416 and the communication application 418, which can be in the form of non-transitory computer-executable instructions, can be resident in the memory device 414 or any suitable computer-readable medium and can be executed by the processor 402. Execution of such program code configures or causes the processor (s) 302 to perform the operations described herein with respect to the nested-heap storage structure 100. While FIG. 4 depicts the nested-heap storage structure application 416 stored within the memory devices 414, other applications associated with other actions described herein may replace the nested-heap storage structure application 416 or be added to the nested-heap storage structure application 416. Further, the communication application 418 may provide instructions for the computing system 400 to communicate with other computing systems.

The computing system 400 may also include an input/output ("I/O") interface 408 that can receive input from input devices or provide output to output devices. The computing system 400 may also be able to communicate with one or more other computing devices or computer-readable data sources using the interface 408. Additionally, a bus 406 can also be included in the computing system 400. The bus 406 can communicatively couple one or more components of the computing system 400 and allow for communication between such components.

The subject matter of the presently disclosed examples is described herein with specificity to meet statutory requirements, but this description is not necessarily intended to limit the scope of the presently disclosed subject matter. The disclosed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The foregoing is provided for purposes of illustrating, explaining, and describing various examples. Having described these examples, it will be recognized by those of skill in the art that various modifications, alternative constructions, and equivalents may be used without departing from the spirit of what is disclosed. Different arrangements of the components depicted in the drawings or described above, as well as additional components and steps not shown or described, are possible. Certain features and subcombinations of features disclosed herein are useful and may be employed without reference to other features and subcombinations. Additionally, a number of well-known processes and elements have not been described in order to avoid unnecessarily obscuring the examples. Examples have been described for illustrative and not restrictive purposes, and alternative examples will become apparent to readers of this patent. Accordingly, examples are not limited to those described above or depicted in the drawings, and various modifications can be made without departing from the scope of the presently disclosed subject matter.

What is claimed is:

1. A system comprising:
a processor;
a referential data structure comprising a set of inner heaps and an outer heap, wherein the outer heap comprises a sorted set of weighted in-memory references to individual component values stored in the set of inner heaps; and
a memory including instructions that are executable by the processor for causing the processor to:
access, from a first component source of a plurality of component sources, a new component value originating from a first component source of a plurality of component sources;

access the set of inner heaps from the referential data structure, wherein each inner heap of the set of inner heaps comprises a sorted set of component values, and wherein the sorted set of component values originate from the plurality of component sources;

assign the new component value to a first inner heap of the set of inner heaps, wherein the new component value comprises an additional value entry to existing component values of the sorted set of component values of the first inner heap;

in response to assigning the new component value to the first inner heap, sort the first inner heap to identify a maximum or minimum value of the first inner heap; and in response to determining that the new component value changes the maximum or minimum value of the first inner heap, update the outer heap of the referential data structure to include a weighted in-memory reference to the new component value of the first inner heap, wherein the outer heap comprises the sorted set of weighted in-memory references to maximum or minimum values of a plurality of inner heaps of the set of inner heaps such that the outer heap defines an ordered set of normalized component values.

2. The system of claim 1, wherein the sorted set of component values of each inner heap of the set of inner heaps comprises an identification of a maximum or minimum component value of the sorted set of component values with remaining component values of the sorted set of component values comprising an unordered state.

3. The system of claim 1, wherein the instructions that are executable by the processor for causing the processor to update the outer heap comprise:

applying a first weighting to the new component value to generate the weighted in-memory reference; and sorting a set of weighted in-memory references of the outer heap using the weighted in-memory reference to generate the sorted set of weighted in-memory references.

4. The system of claim 3, wherein the first weighting is generated using a first location associated with the first inner heap and a second location associated with the outer heap.

5. The system of claim 1, wherein the instructions that are executable by the processor for causing the processor to assign the new component value to the first inner heap comprise:

determining a first location associated with the new component value; and assigning the new component value to the first inner heap associated with the first location.

6. The system of claim 1, wherein the instructions are further executable by the processor for causing the processor to:

access a second new component value;

assign the second new component value to the first inner heap of the set of inner heaps;

in response to receiving the second new component value, sort the first inner heap to identify the maximum or minimum value of the first inner heap; and in response to determining that the second new component value does not change the maximum or minimum value of the first inner heap, maintain the outer heap to include the weighted in-memory reference to the new component value of the first inner heap.

7. The system of claim 1, wherein the new component value comprises an ask or bid value for an order book.

8. A computer-implemented method comprising:

accessing, by a computing device, from a first component source of a plurality of component sources, a new component value originating from a first component source of a plurality of component sources;

accessing, by the computing device, a set of inner heaps from a referential data structure of a memory device of the computing device, the referential data structure comprising an outer heap and the set of inner heaps, wherein the outer heap comprises a sorted set of weighted in-memory references in to individual component values stored in the set of inner heaps, wherein each inner heap of the set of inner heaps comprises a sorted set of component values, and wherein the sorted set of component values originate from the plurality of component sources;

assigning, by the computing device, the new component value to a first inner heap of the set of inner heaps, wherein the new component value comprises an additional value entry to existing component values of the sorted set of component values of the first inner heap;

in response to assigning the new component value to the first inner heap, sorting, by the computing device, the first inner heap to identify a maximum or minimum value of the first inner heap; and in response to determining that the new component value changes the maximum or minimum value of the first inner heap, updating, by the computing device, the outer heap of the referential data structure to include a weighted in-memory reference to the new component value of the first inner heap, wherein the outer heap comprises the sorted set of weighted in-memory references to maximum or minimum values of a plurality of inner heaps of the set of inner heaps such that the outer heap defines an ordered set of normalized component values.

9. The computer-implemented method of claim 8, wherein updating the outer heap comprises:

applying, by the computing device, a first weighting to the new component value to generate the weighted in-memory reference; and sorting, by the computing device, a set of weighted in-memory references of the outer heap using the weighted in-memory reference to generate the sorted set of weighted in-memory references.

10. The computer-implemented method of claim 9, wherein the first weighting is generated using a first location associated with the first inner heap and a second location associated with the outer heap.

11. The computer-implemented method of claim 8, wherein assigning the new component value to the first inner heap comprises:

determining, by the computing device, a first location associated with the new component value; and assigning, by the computing device, the new component value to the first inner heap associated with the first location.

12. The computer-implemented method of claim 8, further comprising:

accessing, by the computing device, a second new component value;

assigning, by the computing device, the second new component value to the first inner heap of the set of inner heaps;

in response to assigning the second new component value to the first inner heap, sorting, by the computing device, the first inner heap to identify the maximum or minimum value of the first inner heap; and in response to determining that the second new component value does not change the maximum or minimum value of the first inner heap, maintaining, by the computing device, the outer heap to include the weighted in-memory reference to the new component value of the first inner heap.

13. The computer-implemented method of claim 8, wherein sorting the first inner heap comprises:

applying, by the computing device, a maximum or minimum identification algorithm to the first inner heap to identify a maximum or minimum component value within the first inner heap.

14. A non-transitory computer-readable medium having instructions stored thereon, the instructions executable by a processing device to perform operations comprising:

accessing, from a first component source of a plurality of component sources, a new component value originating from a first component source of a plurality of component sources;

accessing a set of inner heaps from a referential data structure, the referential data structure comprising an outer heap and the set of inner heaps, wherein the outer heap comprises a sorted set of weighted in-memory references to individual component values stored in the set of inner heaps, wherein each inner heap of the set of inner heaps comprises a sorted set of component values, and wherein the sorted set of component values originate from the plurality of component sources;

assigning the new component value to a first inner heap of the set of inner heaps, wherein the new component value comprises an additional value entry to existing component values of the sorted set of component values of the first inner heap;

in response to assigning the new component value to the first inner heap, sorting the first inner heap to identify a maximum or minimum value of the first inner heap; and in response to determining that the new component value changes the maximum or minimum value of the first inner heap, updating the outer heap of the referential data structure to include a weighted in-memory reference to the new component value of the first inner heap, wherein the outer heap comprises the sorted set of weighted in-memory references to maximum or minimum values of a plurality of inner heaps of the set of inner heaps such that the outer heap defines an ordered set of normalized component values.

15. The non-transitory computer-readable medium of claim 14, wherein the operation of updating the outer heap comprises:

applying a first weighting to the new component value to generate the weighted in-memory reference; and sorting a set of weighted in-memory references of the outer heap using the weighted in-memory reference to generate the sorted set of weighted in-memory references.

16. The non-transitory computer-readable medium of claim 15, wherein the outer heap comprises a geographically normalized order book for a product purchased from or sold to a location associated with the outer heap.

17. The non-transitory computer-readable medium of claim 14, wherein the operation of assigning the new component value to the first inner heap comprises:

determining a first location associated with the new component value; and assigning the new component value to the first inner heap associated with the first location.

18. The system of claim 1, wherein a weighting of individual weighted in-memory references of the sorted set of weighted in-memory references varies based on weighting rules associated with a relationship between the outer heap and the plurality of inner heaps.

19. The computer-implemented method of claim 8, wherein a weighting of individual weighted in-memory references of the sorted set of weighted in-memory references varies based on weighting rules associated with a relationship between the outer heap and the plurality of inner heaps.

20. The non-transitory computer-readable medium of claim 14, wherein a weighting of individual weighted in-memory references of the sorted set of weighted in-memory references varies based on weighting rules associated with a relationship between the outer heap and the plurality of inner heaps.

* * * * *